J. VETTER.
AUTOMOBILE TOP.
APPLICATION FILED MAR. 24, 1919.
1,347,881.
Patented July 27, 1920.
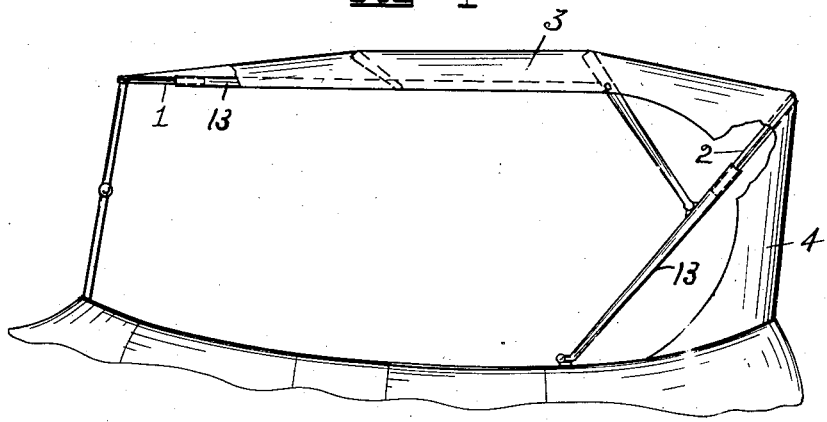
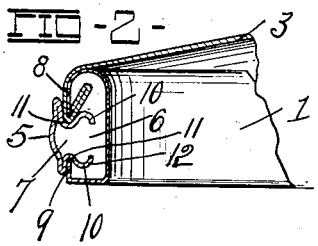
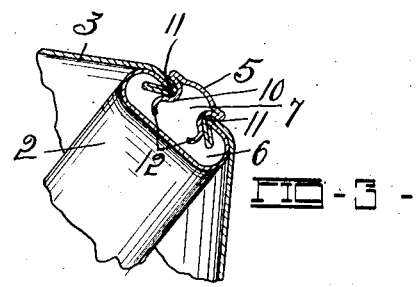
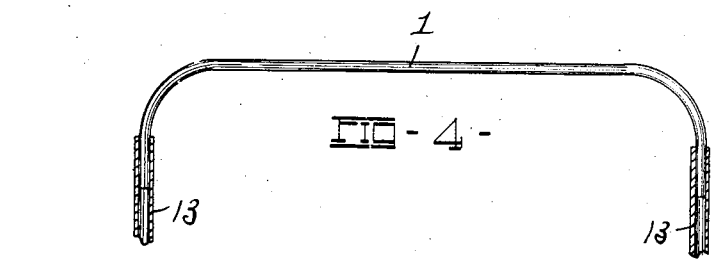
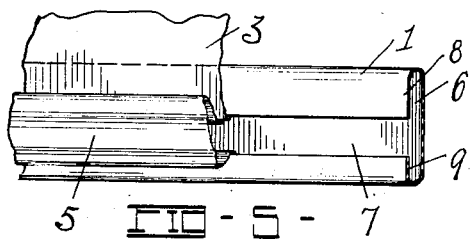
INVENTOR
Joseph Vetter,
By Owen, Owen & Crampton,
His attys.

UNITED STATES PATENT OFFICE.

JOSEPH VETTER, OF TOLEDO, OHIO.

AUTOMOBILE-TOP.

1,347,881.  Specification of Letters Patent.  Patented July 27, 1920.

Application filed March 24, 1919. Serial No. 284,601.

*To all whom it may concern:*

Be it known that I, JOSEPH VETTER, a citizen of the United States, and a resident of Toledo, in the county of Lucas and State of Ohio, have invented a certain new and useful Automobile-Top; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to automobile tops, and particularly to means for securing the deck covering to the top frames of automobiles; and it has for its object the provision of improved means of this character which is capable of quickly and securely attaching the deck covering to the front and rear frame bows of such tops in a manner to permit a quick release thereof for the repair or replacement of the covering or of the frame bows to which attached.

The invention is fully described in the following specification and while, in its broader aspect, it is capable of embodiment in numerous forms, a preferred embodiment thereof is illustrated in the accompanying drawings, in which,—

Figure 1 is a side elevation of an automobile top embodying the invention. Fig. 2 is an enlarged fragmentary vertical section through the front bow of the frame and parts attached thereto. Fig. 3 is a similar section through the rear bow of the frame and parts attached thereto. Fig. 4 is an elevation of one of the bows, either the front or rear bow, with its leg portions in section and partly broken away, and Fig. 5 is a fragmentary front elevation of the front bow and of the deck covering and clamping means associated therewith.
Referring to the drawings, 1 and 2 designate the customary front and rear bows, respectively, of an automobile top frame of the foldable type, 3 the deck covering, 4 the cover back, and 5 the clamping means in which, in connection with the bows 1 and 2, the present invention particularly resides.

The front bow 1 is made of channel form or with the interior chamber 6, the outer side of which is provided with an opening 7 extending lengthwise of the bow and being of less width than the width of the channel 6. The bow 1 is preferably formed of sheet metal which is rolled or shaped transversely to provide the spaced inwardly projecting flanges 8 and 9 at its outer sides which cooperate to form the opening 7. The forward edge of the deck covering 3 is projected into the bow chamber 6 around the upper flange or wall 8 of the opening 7 and is firmly held therein by the holding or clamping member 5.

The clamping member 5 comprises an elongated strip conforming in length to the length of the portion of the opening 7 into which it is desired to clamp the deck covering 3, and is preferably formed of spring sheet metal with its opposite side edges doubled inward and then curved outwardly to form legs 10 having the outwardly opening recesses 11 adjacent to their inner ends for receiving the flanges 8 and 9, together with any material which may be wrapped therearound, and also forming the preferably rounded protuberant portions 12 at the outer sides of said recesses. The space between the protuberant outer edge portions 12 of the legs 10 is greater than the width of the opening 7 so as to require an inward compression of the legs in forcing the protuberant portions thereof into the opening, as is apparent by reference to the drawings. The free ends of the legs 10 are preferably turned inward toward each other and disposed on an incline to facilitate a forcing of the retaining strip into clamping engagement with the walls of the opening 7. The edge of the covering 3 which is projected within the channel of the bow 1 is preferably provided with a hem so as to form a shouldered or thickened edge portion for coaction with the retaining flange of the bow.

The rear bow 2 is of the same construction as the front bow except that both edges thereof are preferably of the same shape to enable the rear edge of the cover 3 to be engaged with one edge flange and the upper edge of the back cover strip 4 to be engaged with the other flange of the bow. The clamping strip 5 for the rear bow may be the same as the clamping strip used in connection with the front bow and is engaged with and released from the bow in the same manner.

The channeled portion of the front and rear bows with which the clamping strips 5 are intended to coact to secure a cover thereto comprise only the looped or bowed portions of the supporting bows, and the major portions of their legs may therefore have the channels or side openings eliminated therefrom. I have therefore illustrated the channeled portions of the bows as having relatively short leg portions which are fitted into carrying extensions 13, or secured thereto in any suitably manner.

It is evident with my invention that a top covering may be easily and quickly secured to the front and rear frame bows by inserting the front and rear edges of the covering in the respective bow channels and then forcing or snapping the clamping strips 5 in place within the channels so that the leg portions of the strips yieldingly expand or press outwardly against the opposite wall of the channel openings and securely hold the covering edges in engagement with the bows. A release or removal of the clamping strips for the purpose of repair or replacement of the covering may be quickly accomplished by inserting the edge of a comparatively sharp instrument, such for instance as a screw-driver, between the outer edge of the clamping strip and the bow and then manipulating the tool to pry the clamping strip outward from engagement with the bow.

It is evident that while I have particularly described my invention as a means for securing the deck covering to the front and rear bows of top frames, it may be used as efficaciously in securing upholstering or seat covers to the bodies or seats of automobiles or the like.

I wish it understood that my invention is not limited to any specific construction, arrangement or form of the parts as it is capable of numerous modifications and changes without departing from the spirit of the claims.

Having thus described my invention, what I claim as new, and desire to secure by Letters Patent, is,—

1. In a top of the class described, a frame bow having a channel therein with overhanging outer edge walls forming an entrance opening, a covering having its edge projecting into said opening, and a retaining strip having a yielding portion adapted to be forced into the channel opening of the bow and to yieldingly coact with the walls thereof to hold the cover edge in engagement therewith, and having an outer head portion which is broader than said yielding portion to limit the extent of insertion of the strip into the bow channel.

2. In a top of the class described, a frame bow having a channel lengthwise thereof and provided with an opening at its outer side which is restricted relative to the width of the channel, and a clamping strip removably projected into said opening and having yielding portions which are inwardly recessed to receive the edge walls of said opening and adapted to yieldingly coöperate with said walls to clamp a portion of a covering therebetween.

3. In a top of the class described, a frame bow having a longitudinally extending channel with a longitudinal opening at its outer side which is restricted in width relative to the width of the channel to form the channel with overhanging edge walls, and a clamping strip of spring metal having its opposite side edge portions turned inward toward each other and then curving outward to form yielding legs having outer longitudinally extending recesses, said legs being adapted to be forced into the channel opening and to receive the edge wall of the opening in its recess to coöperate therewith to yieldingly clamp an interposed material.

4. In a top of the class described, a frame bow having a longitudinally extending channel in its outer side with the mouth of said channel restricted in width relative to the body portion of the channel, and a clamping strip adapted to be removably fitted into the mouth of said channel to coöperate with the walls thereof to clamp interposed covering material, said strip being formed of sheet metal of a springy nature and having its opposite side edge portions turned inwardly toward each other and then outwardly to form recesses for receiving the walls of the channel mouth and to form legs with the portions thereof without the recesses of greater normal width than the width of the channel mouth and terminating in inwardly inclined portions to facilitate a forcing of said legs into the channel mouth.

5. A frame having a channel with overhanging edge walls forming an entrance opening, and a clamping strip having a longitudinally recessed yielding portion extending longitudinally thereof and adapted to be forced into the channel opening to coöperate with edge walls of the opening to yieldingly grip a pliant material therebetween, the recessed portion of the clamping strip receiving the edge walls of the opening.

In testimony whereof I have hereunto signed my name to this specification.

JOSEPH VETTER.